United States Patent
Muccifora et al.

(10) Patent No.: US 12,244,559 B2
(45) Date of Patent: *Mar. 4, 2025

(54) SEAMLESS DEVICE ADDRESS ROTATION

(71) Applicant: Cisco Technology, Inc., San Jose, CA (US)

(72) Inventors: Roberto Muccifora, Ropraz (CH); Domenico Ficara, Essertines-sur-Yverdon (CH); Amine Choukir, Lausanne VD (CH); Anirban Karmakar, Ecublens (CH); Vincent Cuissard, Eteaux (FR); Sudhir Kumar Jain, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/501,275

(22) Filed: Nov. 3, 2023

(65) Prior Publication Data

US 2024/0064125 A1 Feb. 22, 2024

Related U.S. Application Data

(63) Continuation of application No. 17/329,827, filed on May 25, 2021, now Pat. No. 11,855,961.

(51) Int. Cl.
*H04L 61/5061* (2022.01)
*H04L 61/5053* (2022.01)
*H04W 88/02* (2009.01)

(52) U.S. Cl.
CPC ...... *H04L 61/5061* (2022.05); *H04L 61/5053* (2022.05); *H04W 88/02* (2013.01)

(58) Field of Classification Search
None
See application file for complete search history.

(56) References Cited

U.S. PATENT DOCUMENTS

| | | | |
|---|---|---|---|
| 7,971,253 B1 | 6/2011 | Gupta | |
| 11,438,393 B1 * | 9/2022 | Tribble | H04L 61/4511 |
| 2007/0183375 A1 | 8/2007 | Tiwari | |
| 2011/0296165 A1 * | 12/2011 | Suginaka | G09C 1/02 |
| | | | 713/150 |
| 2011/0320813 A1 * | 12/2011 | Suginaka | H04L 63/08 |
| | | | 713/168 |

(Continued)

OTHER PUBLICATIONS

Android Open Source Project: "Privacy: MAC Randomization", https://source.android.com/devices/tech/connect/wifi-mac-randomization, Apr. 27, 2021, 2 pages.

(Continued)

*Primary Examiner* — Mohamed Ibrahim
(74) *Attorney, Agent, or Firm* — Edell, Shapiro & Finnan, LLC

(57) ABSTRACT

Techniques are provided that rotate a device address used to identify a wireless client device on a wireless network. The wireless client device and at least one network infrastructure component identify a plurality of device addresses associated with the wireless client device. In some embodiments, the plurality of device addresses are generated via a corresponding plurality of invocations of a stateful random number generator, such as a cryptographically secure pseudo-random number generator.

20 Claims, 6 Drawing Sheets

(56) References Cited

U.S. PATENT DOCUMENTS

| | | |
|---|---|---|
| 2012/0213211 A1 | 8/2012 | Remaker |
| 2012/0284375 A1 | 11/2012 | Remaker |
| 2013/0219071 A1 | 8/2013 | Higdon et al. |
| 2016/0135053 A1 | 5/2016 | Lee et al. |
| 2017/0013449 A1 | 1/2017 | Raman et al. |
| 2018/0054825 A1 | 2/2018 | Kourzanov |

OTHER PUBLICATIONS

Ansley, C., et al., "Proposal for New Action Frame to Aid Mac Randomization Handling," https://mentor.ieee.org/802.11/dcn/19/11-19-0179-03-0arc-idquery-query-message-proposal.pptx, Jul. 18, 2019, 9 pages.

"Cryptographically secure pseudorandom number generator," Wikipedia, https://en.wikipedia.org/wiki/Cryptographically_secure_pseudorandom_number_generator, retrieved from the Internet on Dec. 28, 2023, 9 pages.

* cited by examiner

SEAMLESS DEVICE ADDRESS ROTATION

CROSS-REFERENCE TO RELATED APPLICATIONS

This application is a continuation of U.S. application Ser. No. 17/329,827, entitled "Seamless Device Address Rotation," filed on May 25, 2021, and issued on Dec. 26, 2023, as U.S. Pat. No. 11,855,961, which application is hereby incorporated by reference herein in its entirety.

TECHNICAL FIELD

The present disclosure relates to secure wireless networking.

BACKGROUND

In an effort to improve privacy of a mobile device user, many mobile operating system are periodically changing (or "rotating") a device address (e.g. a station address) used to identify a mobile device on a wireless network. By changing the device address, it can be more difficult for an eavesdropper to track a location of a mobile device user, but also, in some circumstances, more difficult to monitor their online activities. While rotation of a wireless device's address can improve privacy, much of the legacy wireless network infrastructure was not designed to accommodate such address rotation, and in many cases, uses the device address as an identifier of the wireless device for a variety of processing.

DESCRIPTION OF EXAMPLE EMBODIMENTS

Overview

Figure 1:
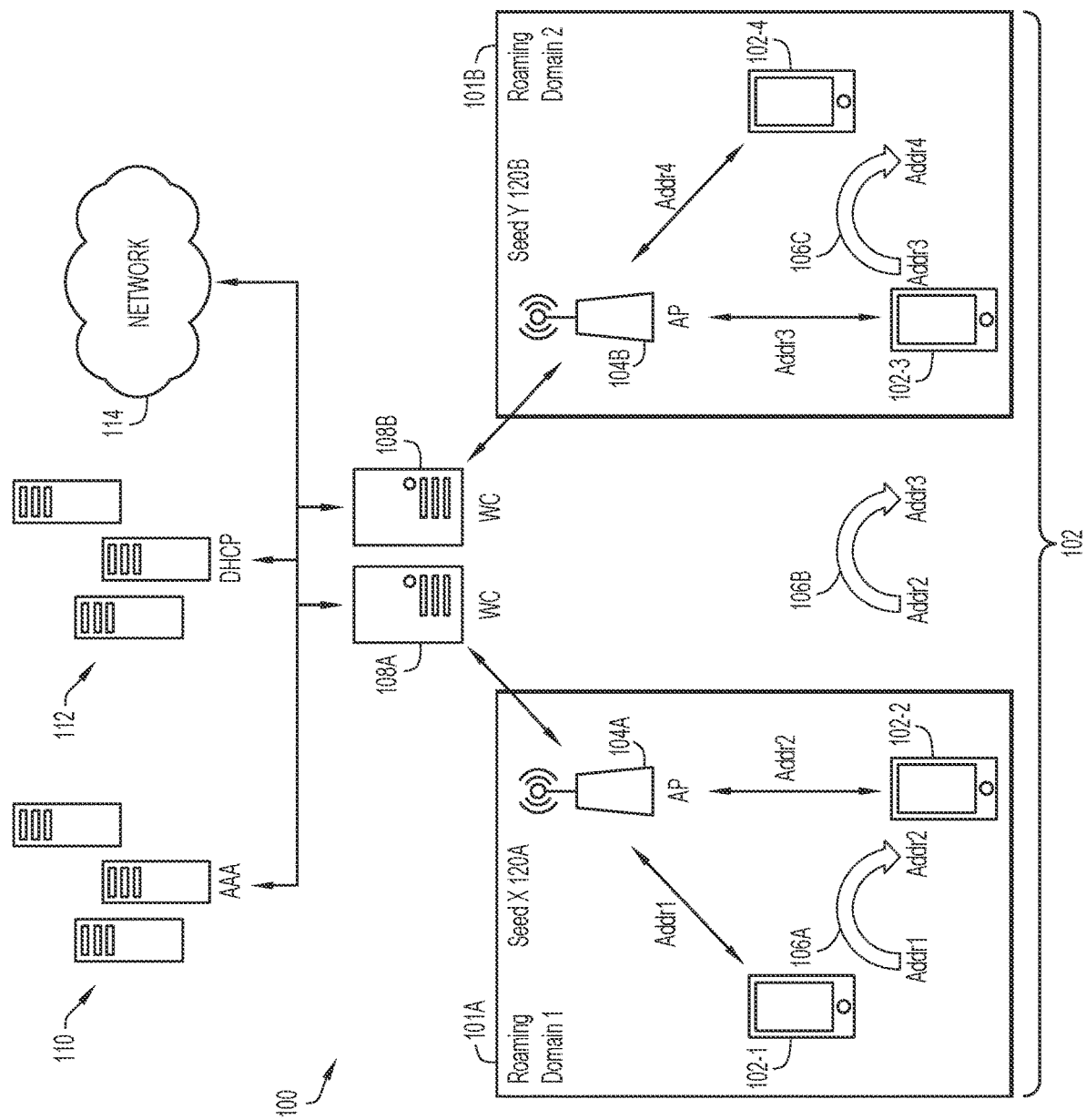
FIG. 1 is an overview diagram of a wireless network configured to accommodate device address rotation according to an example embodiment.

Disclosed herein are embodiments that provide for seamless device address rotation of a wireless client device. In one aspect, a method includes communicating seed information with a wireless client device, and receiving a plurality of network messages, each of the plurality of network messages indicating a different source address. A plurality of device addresses are generated based on the seed information and a corresponding plurality of invocations of a stateful random number generator. A first determination is made that each of the different source addresses match a device address of the plurality of device addresses. Based on the first determination, a second determination is made that the wireless client device transmitted each of the plurality of network messages.

Example Embodiments

To accomplish seamless address rotation, one or more of the wireless client device and the network infrastructure component identify a plurality of device addresses available for use by the wireless client device. An order in which the plurality of device addresses will be employed by the wireless client device is also identified. In some embodiments, the wireless client device and the network infrastructure component each independently generate the plurality of device addresses based on seed information that is shared between the two devices. In some embodiments, the plurality of device addresses are generated based on a corresponding plurality of invocations of a stateful random number generator. In some embodiments, the stateful random number generator is a cryptographically secure pseudorandom number generator (CPSRNG). In one form, the device address is a Media Access Control (MAC) address that is used in network communications.

In some embodiments, a seed used to initialize the stateful random number generator varies by access point, wireless network controller, roaming domain, geolocation, or other variable. Varying the seed value across these various parameters introduces addition entropy into the generated device addresses, making it more difficult for an eavesdropper to track an individual wireless client device.

In embodiments that have the wireless client device and network infrastructure each independently generate the plurality of device addresses, the seed information is shared between the wireless client device and the network infrastructure component using a secured communication channel. In some embodiments, the seed information is shared via an action frame transmitted over the secured communication channel. In some embodiments, the secured communication channel is established via an authentication process and/or association process that occurs between the wireless client device and the network infrastructure component. In some embodiments, the wireless client device generates one or more seed parameters, and then shares those one or more seed parameters with the network infrastructure component. In other embodiments, the network infrastructure generates the seed parameters and provides the seed parameters to the wireless client device.

In some other embodiments, one of the two devices generates the plurality of device addresses, and then shares the plurality of device address with the other device. The plurality of device addresses are shared over a secure communication channel, in a similar manner that the embodiment described above shares seeding information over a secure communication channel. With this alternative approach, there is not necessarily a need to share seeding information between the two devices.

As an illustrative example, a wireless client device generates a first device address NO. A network infrastructure component, such as an AP or wireless local area network (LAN) controller (WLC), generates three possible device addresses of the wireless client device, labeled as N0, N1, and N2. The AP or WLC is able to generate the three possible device addresses since the wireless client device and network infrastructure component have previously shared seed information between the two devices. The AP/WLC observes the wireless client device's use of address N0 to identify itself on a wireless network. The AP/WLC is then able to determine that a next device address to be used by the wireless client device is the address N1. Some embodiments involve the AP/WLC pre-generating one or more additional device addresses before their use by a wireless client device on the wireless network. In these embodiments, the pre-generated addresses are stored and available for reference upon use by the wireless client device. When the pre-generated address is eventually used by the wireless client device, the AP/WLC is able to readily identify that a network message having a source address equivalent to the pre-generated address originated from the wireless client device. A similar process occurs when the wireless client device rotates from the N1 address to the N2 address, or from the N2 address to the N3 address.

In contrast, an eavesdropper observing traffic on the wireless network will be unable to determine that messages having an N0 source address and messages having an N1 source address originated from the same device, since the eavesdropper does not have access to the plurality of device addresses, or the seeding parameters, and thus is unable to correlate the sequence of addresses visible on the wireless network to the single wireless client device.

In some embodiments, multiple wireless client devices are utilizing device addresses generated using the stateful random number generator as described above. While unlikely (e.g. a random number having a range of 1 to $2^{48}$), some address collisions are possible in this case. If an address collision occurs, some embodiments, upon detecting an address collision, select a next device address of the plurality of device addresses for use. Since the network infrastructure component is also able to identify the next device address, the communication between the two devices is unaffected by the collision and resulting rotation.

Thus, the disclosed embodiments offer several advantages over traditional address rotation methods. First, because the wireless client device and network infrastructure are aware of the device addresses used by the wireless client device to identify itself on a wireless network, the infrastructure is able to seamlessly identify network messages that originate from the wireless client device after rotation of the device addresses. Any network infrastructure control actions that are necessary to adjust to the new address can then be performed without introduction of a delay between the time the rotation occurs and when the network infrastructure is able to otherwise detect the rotation. This reduced delay improves the efficiency of the wireless network and reduces latency experienced by the wireless client device after the rotation. Another advantage is that the proposed method can be implemented with modest additional messaging between the wireless client device and network infrastructure. For example, a single additional message is used, in some embodiments, to communicate the seed information between the two devices. Because this additional message is communicated over a secure message channel, there is little risk that an eavesdropper or nefarious actor will obtain the seed information and thus compromise the address generation method. Additionally, the proposed method imposes few changes on the wireless client device. In general, protocol changes should not be necessary. For example, the seed information is communicated, in some embodiments, via a vendor-specific action frame. Additionally, the network infrastructure is able to identify a wireless client device by the network infrastructure very efficiently. For example, a new device address observed on a wireless network invokes, in some embodiments, a single lookup in a precomputed table to identify with which wireless client device the new device address is associated.

FIG. 1 is a diagram of a wireless network 100 implementing device address rotation according to an example embodiment. FIG. 1 shows two roaming domains, a first roaming domain 101A and a second roaming domain 101B. Within each roaming domain is an access point (AP), labeled as AP 104A and AP 104B, respectively. FIG. 1 also shows a wireless client device 102. The wireless client device 102 is shown as it performs three address rotations. When the wireless client device 102 is using each of four different device addresses to identify itself on the wireless network, it is represented by a different image in FIG. 1. For example, a first image 102-1 represents the wireless client device 102 when identifying itself via a first device address. The wireless client device 102 performs a first address rotation 106A from the first device address to a second device address. The wireless client device 102 is represented as a second image 102-2 when the wireless client device 102 is identifying itself via the second device address. The wireless client device 102 performs a second address rotation 106B and rotates its address from the second device address to a third device address. When using the third device address to identify itself, the wireless client device 102 is represented by a third image 102-3. FIG. 1 illustrates the wireless client device 102 performing a third address rotation 106C from the third device address to a fourth device address. When identifying itself using the fourth device address, the wireless client device 102 is represented by a fourth image 102-4. Thus, FIG. 1 illustrates the wireless client device 102 rotating its device address three times, and during the second rotation, the wireless client device moves from the first roaming domain 101A, where it had been in communication with the AP 104A, to the second roaming domain 101B, where it then communicates, or associates, with the AP 104B.

FIG. 1 also illustrates that the AP 104A is in communication with a wireless network controller 108A. AP 104B is in communication with a wireless network controller 108B. Each of the wireless network controllers 108A and wireless network controller 108B communicate with an authorization, authentication, and accounting (AAA) server 110, and a dynamic host control protocol (DHCP) server 112. Each of the wireless network controller 108A and the wireless network controller 108B are also in communication with one or more devices on a network 114.

As discussed above, address rotations, such as the address rotations 106A-C illustrated in FIG. 1, threaten to disrupt network communication of the wireless client device 102. For example, in some embodiments, network infrastructure maintains or associates certain network resources with the wireless client device 102 to enable functional communication of the wireless client device 102. For example, one or more of the AP 104A, AP 104B, wireless network controller 108A, wireless network controller 108B, AAA server 110, or DHCP server 112 allocate network resources, such as addresses, authentication keys, data structures, or other resources to the wireless client device 102. In at least some legacy network infrastructure implementations, these allocated resources are tracked by these network infrastructure components based on a device address of the wireless client device 102. When the wireless client device 102 changes its device address via rotation, these network infrastructure components potentially identify the wireless client device 102 as a different device. This can result in network infrastructure components generating new resource allocations for the wireless client device 102, and potentially discarding or otherwise releasing previous resource assignments that were allocated to or associated with a prior device address. This introduces inefficiencies into network operation. Further, delays can be introduced in a wireless client device's ability to communicate on a network until the network infrastructure is able to accommodate the new device address.

Embodiments disclosed herein provide for improved address rotation by ensuring network infrastructure is able to store or generate a list of device addresses that are used by a wireless client device. In some embodiments, both the wireless client device 102 and a network infrastructure device, such as the AP 104A and/or AP 104B, generate a plurality or sequence of device addresses in parallel. Thus, when a wireless client device rotates its device address from a first address of the sequence to a second address of the sequence, the network infrastructure is able to identify that a network message including the second address originated from the same wireless client device. To ensure the plurality of device addresses are not easily predictable by a nefarious actor, some embodiments utilize a stateful random number generator, such as a cryptographically secure pseudo random number generator (CSPRNG) to generate each device address in the plurality or sequence of device addresses. Seed information is provided to the stateful random number generator so as to make the plurality of device addresses relatively unique across different wireless client devices. FIG. 1 shows that the wireless client device 102 varies the seed information for the stateful random number generator based on the roaming domain in which it is communicating. For example, FIG. 1 shows the wireless client device 102 generating its device addresses using first seed information 120A (e.g. seed "X") in the first roaming domain 101A. The wireless client device 102 utilizes second seed information 120B (e.g. seed "Y") in the second roaming domain 101B. Thus, the AP 104A maintains a first list of device addresses utilized by the wireless client device 102 when operating in the first roaming domain 101A and the AP 104B maintains a second list of device addresses for the wireless client device 102 when it operates in the second roaming domain 101B. In this example embodiment, the wireless client device 102 maintains or is otherwise aware of the two different lists of device addresses. A first list of device addresses is generated based on the first seed information 120A, and the wireless client device 102 selects an address from the first list when rotating within the first roaming domain 101A. A second list of device addresses is generated based on the second seed information 120B for operation by the wireless client device 102 in the second roaming domain 101B. When the wireless client device 102 performs the second address rotation 106B, it rotates from the second device address (which was selects from the first list appropriate for the first roaming domain 101A) to the third device address (which was selected from the second list appropriate for the second roaming domain 101B).

Thus, by rotating its device address from a list of device addresses that is shared or otherwise available with network infrastructure, the network infrastructure is able to more readily accommodate address rotations by the wireless client device. In some embodiments, the network infrastructure is able to adjust network resource assignments such that these network resources remain allocated to the wireless client device 102 as it rotates its address through each of the address rotations 106A-C illustrated in FIG. 1. Operation of these embodiments is described further below with respect to FIGS. 2-6.

Figure 2:
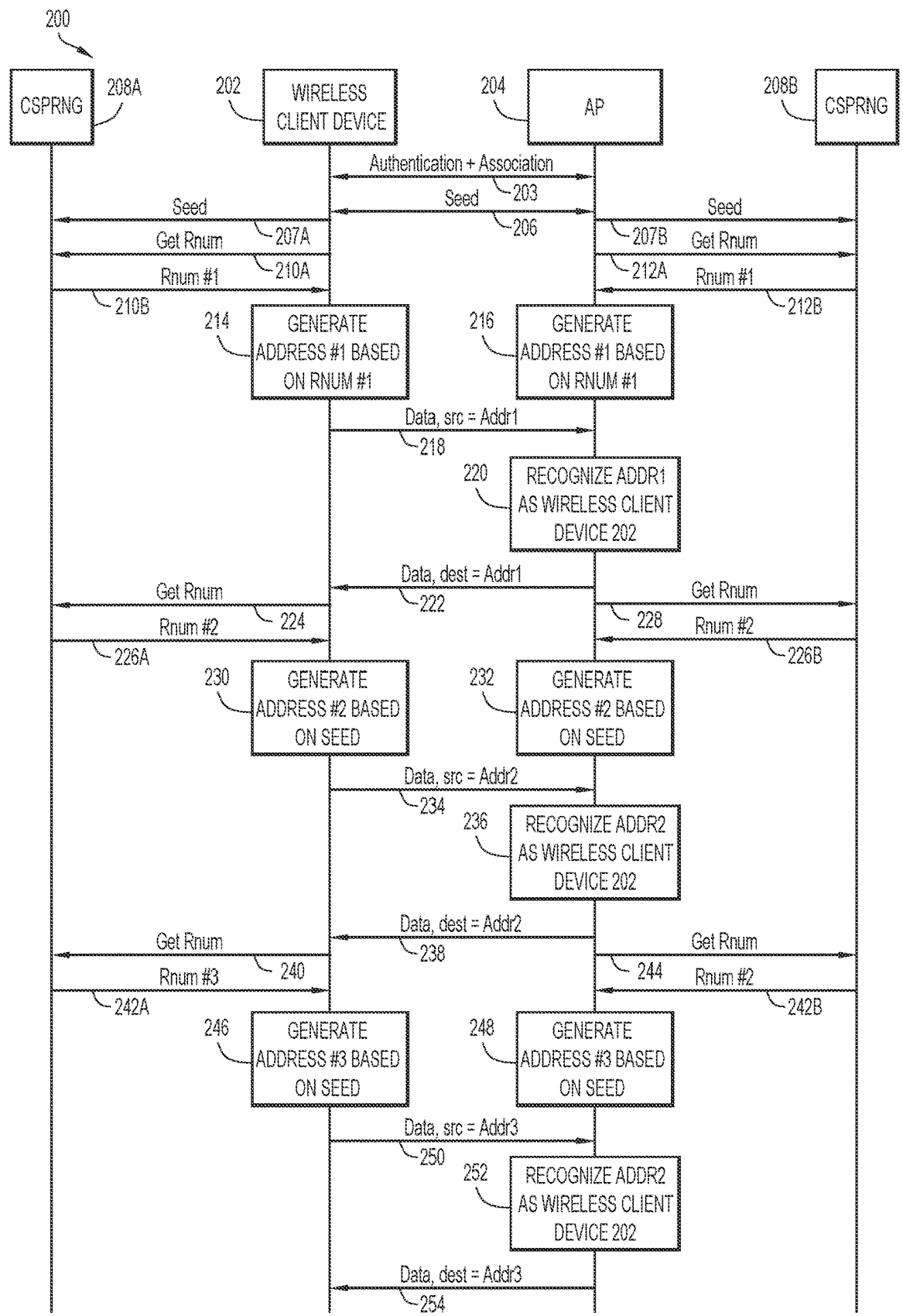
FIG. 2 is a sequence diagram showing a wireless client device and a network infrastructure component performing parallel generation of device addresses in accordance with an example embodiment.

FIG. 2 is a sequence diagram 200 showing a wireless client device and a network infrastructure component performing parallel generation of device addresses in accordance with an example embodiment. A wireless client device 202 participates in an authentication and association process 203 with an AP 204. The authentication process include a 4-way handshake in some embodiments, or authentication consistent with an Extensible Authentication Protocol (EAP) in some embodiments. FIG. 2 then shows the wireless client device 202 and the AP 204 exchanging seed information via a message 206. In some embodiments the seed information is a number value. The number value is provided as an input parameter to a stateful random number generator. The seed initializes the state of the random number generator such that a first random number in a sequence of random numbers can be produced.

Thus, FIG. 2 illustrates the wireless client device 202 providing a seed value 207A, derived from the seed information, to a local instance of a stateful random number generator 208A. The AP 204 also provides the seed value to a local instance of a stateful random number generator 208B. The wireless client device 202 then requests a pseudo random number from the local instance of the stateful random number generator 208A via request 210A. The local instance of the stateful random number generator 208A then provides a pseudo random number 210B to the wireless client device 202. Similarly, the AP 204 requests a pseudo random number from the local instance of the stateful random number generator 208B via request 212A. The local instance of the stateful random number generator 208B then provides a pseudo random number 212B to the AP 204. Upon receiving the pseudo random number 210B from the local instance of the stateful random number generator 208A, the wireless client device 202 generates, in step 214, a first device address based on the pseudo random number 210B. In some embodiments, generating a device address based on a pseudo random number includes truncating, shifting, hashing, or otherwise modifying the pseudo random number to comply with a device address format. Similarly, upon receiving the pseudo random number 212B from the local instance of the stateful random number generator 208B, the AP 204 generates, in step 216, the first device address based on the pseudo random number 212B. Both the wireless client device 202 and AP 204 utilize an equivalent process to transform the pseudo random number 210B and pseudo random number 212B into device addresses.

After generating the device address, the wireless client device 202 sends a data message 218 that identifies the wireless client device 202, via the first device address, as a source of the data message 218. Because the AP 204 has also generated the first device address and associated the first device address with the wireless client device 202, the AP 204 recognizes in step 220 that the data message 218 was originated by the wireless client device 202. As discussed above, the AP 204 is able to recognize that the first device address identifies the wireless client device 202 because both the wireless client device 202 and the AP 204 have identified, based on the invocation of their respective local instances of a pseudo random number generator, that the first device address is associated with the wireless client device.

Since the AP 204 has observed that the wireless client device 202 is using the first device address to identify itself in the data message 218, the AP 204 also identifies the wireless client device 202 via the first device address in an incoming data message 222. For example, the AP 204 receives, in some embodiments, a data message destined for the wireless client device 202 from a remote network, such as the network 114 discussed above with respect to FIG. 1. The AP 204 translates, in some embodiments, an infrastructure device address that identifies the wireless client device to devices on the network 114, to the first device address based on the observed use of the first device address in the data message 218.

FIG. 2 further illustrates the wireless client device 202 invoking the local instance of the stateful random number generator 208A to request an additional random number via request 224. The local instance of the stateful random number generator 208A provides a second random number 226A to the wireless client device 202. Similarly, the AP 204 requests an additional random number via request 228 from its own local instance of the stateful random number generator 208B. The second random number 226B is then provided. Both the wireless client device 202 and the AP 204 then generate a second device address in step 230 and step 232, respectively. The wireless client device 202 then utilizes the second device address to identify itself (e.g. via a source address field) in a data message 234. Upon receiving the data message 234, the AP 204 determines that the wireless client device 202 is utilizing the second device address to identify itself on the wireless network in step 236. Upon receiving a message destined for the wireless client device, the AP 204 is then able to set a destination address of a data message 238 to the second device address, and transmit the data message 238 on the wireless network.

FIG. 2 illustrates a third request 240 by the wireless client device 202 to the local instance of the stateful random number generator 208A for a third random number. The local instance of the stateful random number generator 208A then provides a third random number 242A. Similarly, the AP 204 requests a random number from the local instance of the stateful random number generator 208B via request 244, and receives the third random number 242B. The wireless client device 202 utilizes the third random number to generate a third device address in step 246. The AP 204 utilizes the third random number 242B to generate the third device address in step 248. The wireless client device 202 then sends a data message 250 that identifies the wireless client device 202 via the third device address. Upon observing the data message 250 that identifies the wireless client device 202 via the third device address, the AP 204 determines that the wireless client device 202 is using the third device address to identify itself on the wireless network in step 252. Thus, when the AP 204 receives a message destined for the wireless client device 202 (e.g. from the network 114 specifying an infrastructure address identifying the wireless client device 202), the AP 204 is able to generate a data message 254 that identifies the wireless client device 202 as a destination of the data message 254 by specifying the third device address as a destination address in the data message 254.

Thus, the data message 218, data message 234, and data message 250 represent a plurality of network messages, each having a different source device address, but all originating from the wireless client device 202. The AP 204 is able to recognize that these data messages originate from the wireless client device 202 because the AP 204 is able to generate a sequence of random numbers in steps 216, 232, and 248 equivalent to random numbers generated by the wireless client device in steps 214, 230, and 246. This equivalent sequence of random numbers is provided by each of the wireless client device 202 and AP 204 interacting with their respective local instances of the stateful random number generators 208A and 208B, which were both initialized with equivalent seed information via seed value 207A and seed value 207B.

While FIG. 2 illustrates the AP 204 generating device addresses before a data message is received from the wireless client device 202 that references the device address (e.g. the first device address is generated in step 216, then included in the data message 218 received after step 216 executes), other embodiments vary the timing of device address generation relative to other actions discussed with respect to FIG. 2. For example, some embodiments of an AP, upon receiving a data message including a previously unknown device address, generate device addresses in an attempt to identify a source of the data message. Thus, these embodiments would show a variation of FIG. 2 with the generation of the first device address in step 216 occurring after the AP 204 received the data message 218.

Figure 3:
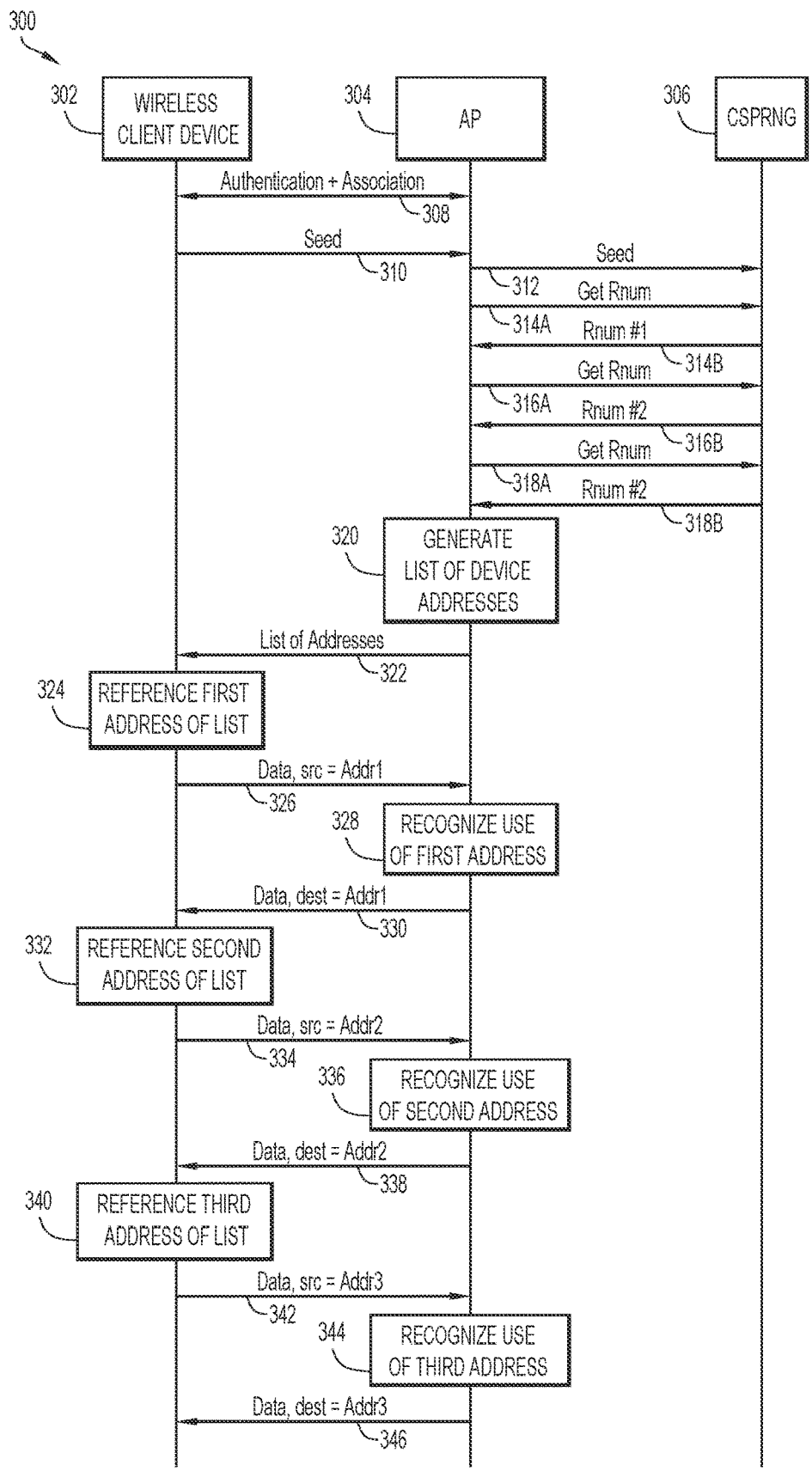
FIG. 3 is a sequence diagram illustrating generation of a plurality of device addresses by the access point for use by the wireless client device in accordance with an example embodiment.

FIG. 3 is a sequence diagram 300 illustrating generation of a plurality of device addresses by the access point for use by the wireless client device in accordance with an example embodiment. FIG. 2 above provided an example of a wireless client device and an access point each generating an equivalent plurality of device addresses. The example of FIG. 3 differs from the embodiment of FIG. 2 in that, in the embodiment of FIG. 3, a single device generates the plurality of device addresses. The plurality of device addresses are then shared with the other device. The two devices are then able to maintain seamless communication with each other as one of the devices rotates through the plurality of devices addresses. In some embodiments of the approach described in FIG. 3, since only one device is generating the device addresses, there is not a need to share seed information between the two devices.

FIG. 3 shows a wireless client device 302, and an AP 304. The AP 304 maintains a local instance of a stateful random number generator. In the embodiment of FIG. 3, the stateful random number generator is a CSPRNG 306. FIG. 3 illustrates the wireless client device 302 and the AP 304 participating in an authentication and association process 308. In some embodiments, the authentication and association process 308 includes an EAP authentication. A result of the authentication and association process 308 is the establishment of a secure communication channel between the wireless client device 302 and the AP 304.

FIG. 3 shows the wireless client device 302 participating in a seed information exchange 310 with the AP 304. In some embodiments, the wireless client device 302 generates seed information (e.g., based on a roaming domain in which it is operating), and provides the seed information to the AP 304. For example, the wireless client device 302 generates the seed information based on a roaming domain in which the wireless client device 302 is operating. In some other embodiments, the AP 304 generates seed information independent of the wireless client device 302, and thus, the seed information exchange 310 does not occur. In some embodiments, the seed information exchange 310 provides seed information that is a whole number. The seed information, in some embodiments, is used by the AP 304 to initialize a local stateful random number generator, such as the CSPRNG 306. Thus, FIG. 3 illustrates the AP 304 providing, for example, via an Application Programming Interface (API) call 312, the seed information to the CSPRNG 306.

The AP 304 then requests a sequence of random numbers from the CSPRNG 306. The requests for this sequence of random numbers is shown as requests 314A, 316A, and 318A. The CSPRNG 306 responds to the requests with a first random number 314B, second random number 316B, and a third random number 318B respectfully. The AP 304 then generates a list of device addresses based on the three random numbers (or more) in step 320. As discussed above with respect to FIG. 2, in some embodiments, a random number generated by a stateful random number generator (e.g., CSPRNG 306) does not necessarily conform to a format of a device address. The random number is, in some embodiments, a different length, or has impermissible values in one or more bit positions relative to what is allowed in a device address format. Thus, the AP 304 performs one or more of truncation, bit shifting, exclusive or operations, hashing, masking, or other operations to generate a device address based on each random number received from the CSPRNG 306. Thus, in this example, the AP 304 generates a first device address, second device address, and third device address, based on each of the first random number 314B, second random number 316B, and third random number 318B respectively. The AP 304 then communicates the plurality of device addresses generated from the three random numbers, including the first random number 314B, second random number 316B, and third random number 318B to the wireless client device 302 via an address list message 322. An example format of the address list message 322 is discussed below with respect to FIG. 4B.

Upon receiving the list of device addresses from the AP 304, the wireless client device 302 then references a first device address in the list of device addresses in step 324 to identify itself (e.g. via a source address field) in the data message 326. Note that the address list message 322 includes a list of addresses, but also, in at least some embodiments, implies or explicitly communicates an order of the provided addresses. The order indicates which address in the list should be used first by the wireless client device 302, which address should be used last, etc. In some embodiments, the order is implied by an order of the addresses themselves in the address list message 322.

Upon receiving the data message 326, the AP 304 recognizes that the wireless client device 302 is identifying itself using the first device address in step 328. In some embodiments, the AP 304 stores a list of device addresses associated with the wireless client device 302. The AP 304 stores, in some embodiments, a list of device addresses for each wireless client device the AP 304 is associated with or otherwise in communication with. When a new device address is observed on the network, some APs search their lists to determine if the observed address is included in one of the lists. If the observed address is on one of the lists, the AP then determines the data message originated from the device associated with the list. Some APs then store a record or indicator of which of the addresses on a wireless client device's list is a "current" address, or an address that the AP 304 uses to identify the wireless client device when transmitting a message on a wireless network (with the message destined for the wireless client device). For example, some embodiments of an AP (or other network infrastructure component) maintain a mapping between an "over the air" (OTA) device address used to communicate with a wireless client device, and a different device address the AP (or other network infrastructure component) utilizes to identify the wireless client device to other devices outside the wireless network. Thus, the AP's record of which device address is "current" for a particular wireless client device determines, in some embodiments, which OTA address is mapped to the particular wireless client device's infrastructure address.

While the AP 304 understands that the wireless client device 302 is identifying itself using the first device address, the AP 304 communicates messages destined for the wireless client device 302, such as data message 330, by specifying the first device address as a destination address of the data messages (e.g. data message 330). FIG. 3 then shows the wireless client device 302 rotating its device address from the first device address to the second device address via step 332. The wireless client device 302 then sends a data message 334, and identifies itself as a source of the data message 334 by specifying the second device address in a source address field of the data message 334.

Upon receiving the data message 334, the AP 304 recognizes that the wireless client device 302 is using the second device address to identify itself in step 336. Thus, the AP 304 sends a data message 338 to the wireless client device 302, and identifies the wireless client device 302 via the second device address in the data message 338.

At a later time, the wireless client device 302 references the third device address in step 340 and rotates its device address from the second device address to the third device address. The wireless client device 302 then sends a data message 342, and identifies itself in the data message 342 via the third device address (e.g., in a source address field in the data message 342). The AP 304 then recognizes the data message 342 identifies the wireless client device 302 in step 344 (e.g. in some embodiments, by identifying the third device address in a list of device addresses associated with the wireless client device 302 as discussed above). The AP 304 then sends a data message 346 to the wireless client device 302, and identifies the wireless client device 302 via the third device address in the data message 346.

Thus, FIG. 3 illustrates an embodiment that provides a coordination of device address rotation between the wireless client device 302 and the AP 304, with the wireless client device 302 off loaded from generating the device addresses. Instead, the AP 304 generates the device addresses, using a stateful random number generator, and then sends the list of device addresses to the wireless client device 302 for its use. Since both the wireless client device 302 and the AP 304 are aware of the list of device addresses, and a respective order of use of the device addresses, a rotation of device addresses according to the list by the wireless client device does not disrupt the ability of the AP 304 ability to detect that the messages, having source addresses from the provided list, originate from the wireless client device.

Figure 4A:
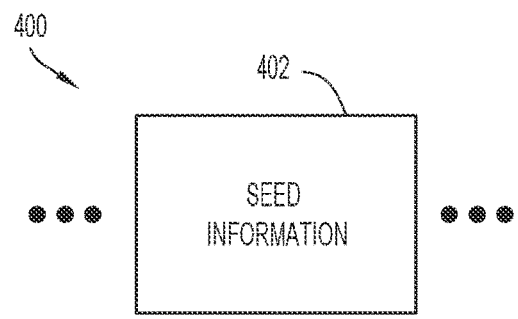
FIG. 4A is a diagram illustrating a format of a portion of a message including seed information.

FIG. 4A is a diagram illustrating a format of a portion of a message including seed information. The message portion 400 includes a seed information field 402. In some embodiments, the message portion 400 is included in the message 206 or seed information exchange 310 discussed above with respect to FIG. 2 and FIG. 3, respectively. In some embodiments, the seed information field 402 stores a number. The number is provided as input, in some embodiments, to a stateful random number generator. As discussed above, some embodiments share seed information between a wireless client device and a network infrastructure component, such as an access point, such that the wireless client device and network infrastructure component are able to generate an equivalent plurality of device addresses having a defined order (e.g. an order equivalent to an order in which the device addresses are generated).

Figure 4B:
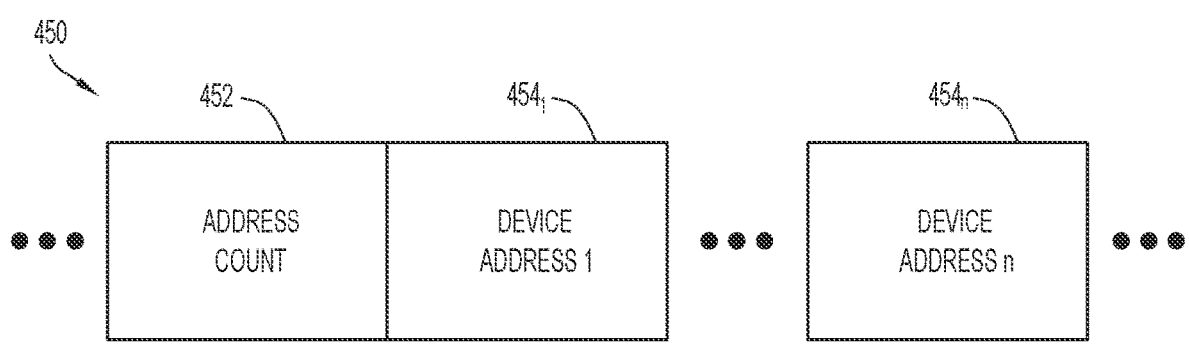
FIG. 4B is a diagram illustrating a format of a portion of a message that communicates a plurality of device addresses to a wireless client device, in accordance with an example embodiment.

FIG. 4B is a diagram illustrating format of a portion of a message that communicates a plurality of device addresses to a wireless client device, in accordance with an example embodiment. As discussed above with respect to FIG. 3, some embodiments offload processing overhead from a wireless client device by generating a plurality of device addresses at a network infrastructure component, where processing power is less constrained. The generated device addresses are then provided to the wireless client device for its use. Thus, some embodiments use a message including one or more of the fields of the message portion 450 of FIG. 4B to communicate the plurality of device address from the network infrastructure component to the wireless client device. The message portion 450 includes an address count field 452, and a number of address fields, illustrated in FIG. 4B as address fields $454_1 \ldots 454_n$. (e.g., n is equivalent to the number stored in the address count field 452). In some embodiments, an order of device addresses in the address fields $454_1 \ldots 454_n$ indicates an order in which the network infrastructure device expects the wireless client device to utilize the device addresses. Thus, the network infrastructure device, in some embodiments, tailors its operation based on the implied order. In some embodiments of the message portion 450, the order is explicitly indicated, for example, via an additional field in the message portion 450 for each address specified in address fields $454_1 \ldots 454_n$, with the additional field indicating an order in which the address in the corresponding address field is to be employed or otherwise utilized by the wireless client device.

Figure 5:
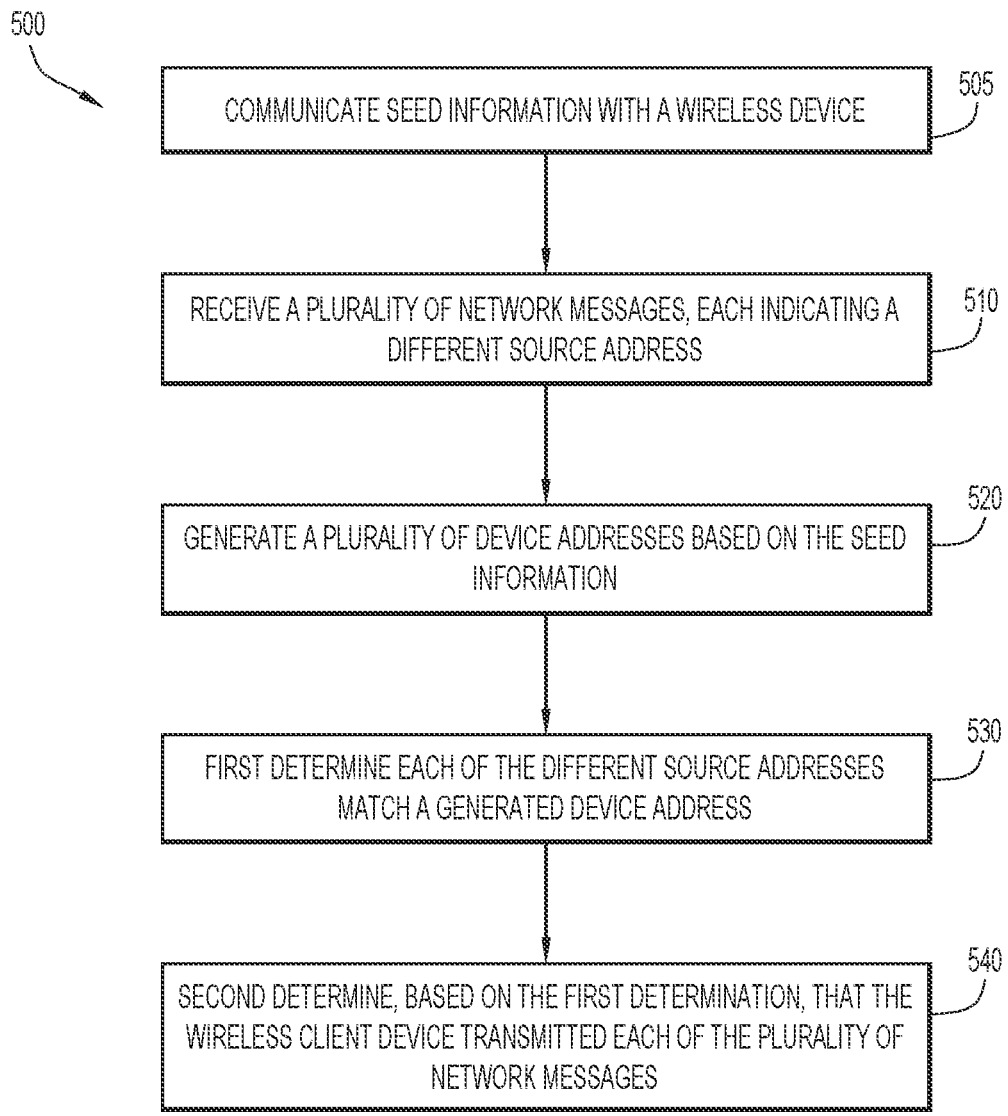
FIG. 5 is a flowchart of a method of generating a plurality of device addresses in accordance with an example embodiment.

FIG. 5 is a flowchart of a method of generating a plurality of device addresses in accordance with an example embodiment. In some embodiments, the method 500 of FIG. 5 is performed by a network infrastructure component, such as an AP or wireless network controller. A device performing the method 500 is referred to below as an "executing device."

In operation 505, seed information is communicated with a wireless client device. In some embodiments, the executing device determines the seed information and transmits a message to the wireless client device, with the message indicating the seed information. Some example, some network infrastructure components are assigned particular seed values or seed value ranges depending on which roaming domain they operate within. These network infrastructure components then select a seed value from the range and provide the seed value to a wireless client device to facilitate address generation, or the network infrastructure components themselves generate device addresses based on the selected seed value.

Similarly, in some embodiments where the wireless client device determines the seed information, some wireless client devices determine network domain or network roaming domain information, and determine the seed information based on the network domain or network roaming domain information. In some embodiments, the seed information is communicated between the wireless client device and the executing device via a secure channel. The secure channel is established, in at least some embodiments, via an authentication and/or an Institute of Electrical and Electronics Engineers (IEEE) 802.11 association process that occurs between the wireless client device and the executing device before the seed information is exchanged.

Some embodiments of operation 505 include communication of a periodicity of rotation between the wireless client device and the executing device. Sharing information regarding periodicity of rotation between devices can provide efficiencies in how the wireless client device and/or network infrastructure manage a list of device addresses allocated for use by the wireless client device.

Some embodiments of operation 505 include communicating capability information between the wireless client device and the executing device. The capability information indicates whether the wireless client device and/or the executing device support address rotation according to embodiments disclosed herein. Upon receiving capability information from the wireless client device, some embodiments decode a capability indicator from an information element. The decoding indicates whether the wireless client device supports either performing parallel device address generation based on shared seed information (e.g. per the embodiment of FIG. 2, or receiving a list of device addresses for its use (e.g., per the embodiment of FIG. 3). Thus, execution of operations 510-550 below is conditioned, in at least some embodiments, on whether both the wireless client device and executing device support this capability.

In operation 510, a plurality of network message are received. Each of the plurality of network messages indicate a different source device address. The plurality of network messages are not necessarily continuously received in operation 510. In other words, in some embodiments, an additional one or more network messages are received in an interspersed manner between one or more of the plurality of network messages. An example of a plurality of received network messages is discussed above with respect to FIG. 2 and data messages 218, 234, and 250, or with respect to FIG. 3, data messages 326, 334, and 342.

In operation 520, a plurality of device addresses are generated based on the seed information. As discussed above, some embodiments generate a plurality of device addresses via a corresponding plurality of invocations of a stateful random number generator, such as a cryptographically secure random number generator. As discussed above with respect to FIG. 3, some embodiments transmit the plurality of device addresses to the wireless client device (e.g. via a message including one or more of the fields discussed above with respect to message portion 450). The transmission of the plurality of device addresses also indicates an order in which the wireless client device is to employ or otherwise use the plurality of device addresses on the wireless network. Embodiments that provide the device addresses to the wireless client device in this manner offload the wireless client device from incurring a processing cost associated with the generation.

In operation 530, a determination is made that each of the different source addresses match or are otherwise equivalent to one of the generated plurality of device address of operation 520. As discussed above, some embodiments of an AP or an executing device maintain a list of device addresses associated with a wireless client device. Thus, if the executing device (e.g. an AP or other network infrastructure device) is in communication with n devices, the executing device maintains n lists of device addresses, each list associated with one of the n devices. Thus, some embodiments of operation 530 search one or more of these n lists, and find or otherwise identify each of the different source addresses are included in one of the n lists. That one list is associated with the wireless client device.

Operation 540 determines that each of the plurality of received messages were transmitted or otherwise originated from the wireless client device. The determination is made based on a finding in operation 530 that each of the different source addresses is included on a list of device addresses available for use by the wireless client device (e.g. a first device address, second device address, and third device addresses discussed above with respect to FIG. 2 and/or FIG. 3).

As discussed above, some network infrastructure allocates, assigns, or otherwise associates network resources with a wireless client device communicating in a wireless network. These resources include, for example, encryption keys, infrastructure addresses, IP addresses, DHCP leases, or other resources. In some embodiments, these resources are associated with a particular wireless client device via a device address used by the wireless client device. Thus, if the device address is changed via rotation, these associations, assignments, or allocations can be disrupted. Thus, some embodiments, when identifying that each of the plurality of network messages originate or are transmitted by the wireless client device, the network infrastructure sequentially associates a network resource with each source address as it is used by the wireless client device, such that those network resources remain available and relevant to the wireless client device. For example, as discussed above, some embodiments map from an OTA device address, used by the wireless client device to communicate on a wireless network, and subject to rotation, to an infrastructure device address, which identifies the wireless client device to one or more other devices located on a different network, such as the network 114 (e.g. such as an external network). Thus, some embodiments of operation 540 update this mapping to reflect a new device address after a rotation.

Some embodiments of the method 500 detect an address collision of one of the different source addresses discussed above. As these addresses are generated according to a stateful random number generator, such collisions, while unlikely, are possible. If a collision is detected, some embodiments advance use of device addresses, according to the order, to a next device address in the plurality of device addresses.

Figure 6:
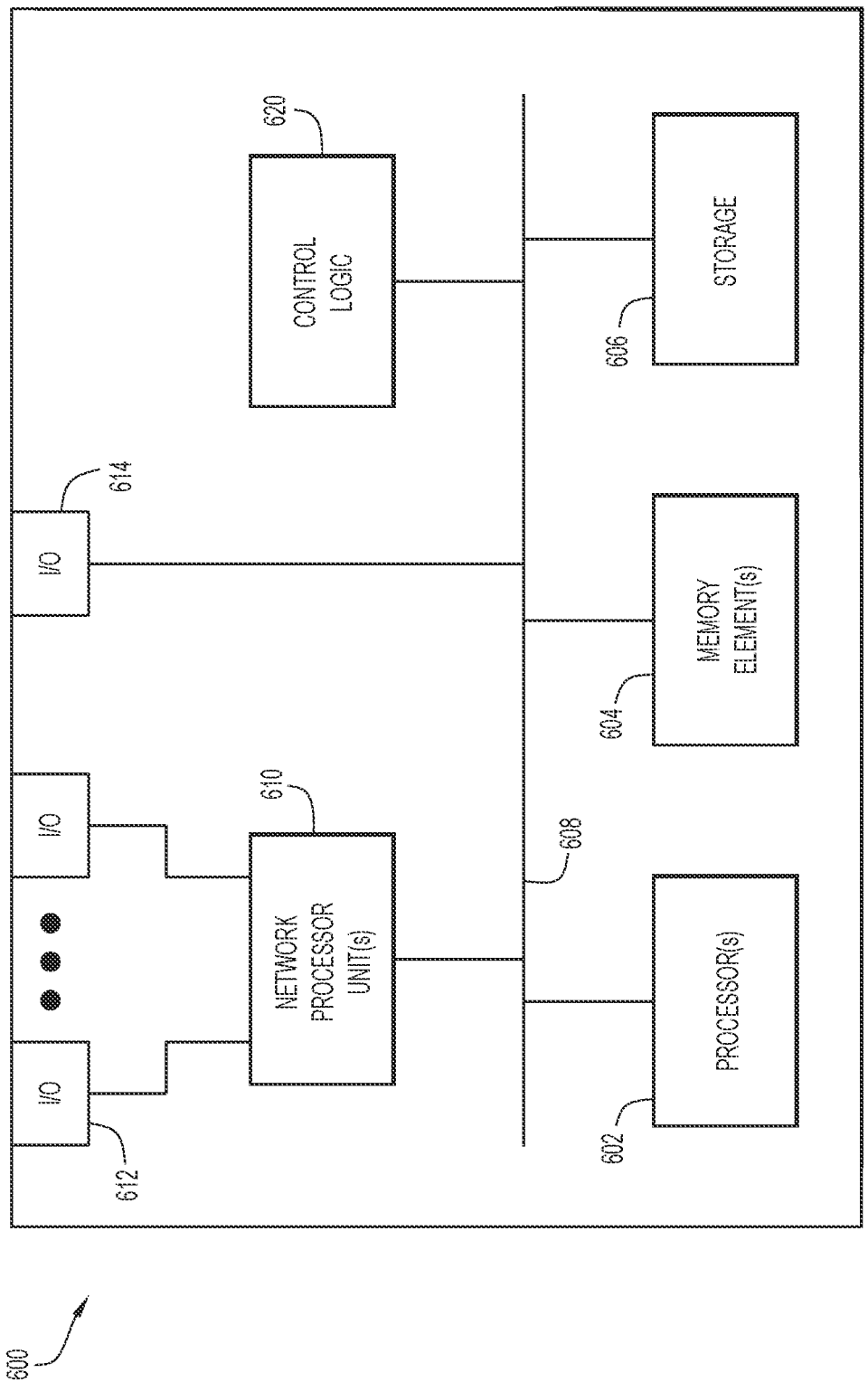
FIG. 6 is a hardware diagram of a device that may perform functions associated with operations discussed herein in connection with the techniques depicted in any one or more of FIGS. 1-5.

FIG. 6 is a hardware diagram of a device 600 that may perform functions associated with operations discussed herein in connection with the techniques depicted in any one or more of FIGS. 1-5. In various embodiments, any of the devices described above (e.g., an AP, a wireless network controller, an AAA server, a DHCP server, or an address resolution protocol (ARP) server) implement, in some embodiments, a computing architecture analogous to that described below with respect to the device 600.

In at least one embodiment, the device 600 may include hardware processing circuitry such as one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for device 600 can overlap in any manner and are not limited to the specific allocation of instructions and/or operations described herein.

In at least one embodiment, processor(s) 602 is/are at least one hardware processor configured to execute various tasks, operations and/or functions for device 600 as described herein according to software and/or instructions configured for device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, physical layer (PHY), controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with device 600, and/or logic configured for memory element(s) 604 and/or storage 606. For example, any logic described herein (e.g., control logic 620) can, in various embodiments, be stored for device 600 using any combination of memory element(s) 604 and/or storage 606. Note that in some embodiments, storage 606 can be consolidated with memory element(s) 604 (or vice versa), or can overlap/exist in any other suitable manner.

In at least one embodiment, bus 608 can be configured as an interface that enables one or more elements of device 600 to communicate in order to exchange information and/or data. Bus 608 can be implemented with any architecture designed for passing control, data and/or information between processors, memory elements/storage, peripheral devices, and/or any other hardware and/or software components that may be configured for device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between device 600 and other systems, devices, or entities, via network I/O interface(s) 612 (wired and/or wireless) to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between device 600 and other systems, devices, or entities to facilitate operations for various embodiments described herein. In various embodiments, network I/O interface(s) 612 can be configured as one or more Ethernet port(s), Fibre Channel ports, any other I/O port(s), and/or antenna(s)/antenna array(s) now known or hereafter developed. Thus, the network processor unit(s) 610 and/or network I/O interface(s) 612 may include suitable interfaces for receiving, transmitting, and/or otherwise communicating data and/or information in a network environment.

I/O interface(s) 614 allow for input and output of data and/or information with other entities that may be connected to device 600. For example, I/O interface(s) 614 may provide a connection to external devices such as a keyboard, keypad, a touch screen, and/or any other suitable input and/or output device now known or hereafter developed. This may be the case, in particular, when the device 600 serves as a user device described herein. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, such as display, particularly when the device 600 serves as a user device as described herein.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory element(s) 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, compact disc (CD) read only memory (ROM) (CD-ROM), digital video disc (DVD), memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., fourth generation (4G)/fifth generation (5G)/next generation (nG), IEEE 802.11 (e.g., Wi-Fi®/Wi-Fi6®), IEEE 802.15 (e.g. Wireless Personal Area Networks (WPAN)), IEEE 802.16 (e.g., Worldwide Interoperability for Microwave Access (WiMAX)), Radio-Frequency Identification (RFID), Near Field Communication (NFC), Bluetooth™, millimeter (mm).wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In one form, a method is provided that comprises communicating seed information with a wireless client device, receiving a plurality of network messages, each of the plurality of network messages indicating a different source address, generating a plurality of device addresses based on the seed information and a corresponding plurality of invocations of a stateful random number generator, first determining that each of the different source addresses match a device address of the plurality of device addresses, and second determining, based on the first determining, that the wireless client device transmitted each of the plurality of network messages.

In another form, an apparatus is provided that comprises a network interface configured to enable network communications, one or more processors, and one or more memories storing instructions that when executed configure the one or more processors to perform operations comprising communicating seed information with a wireless client device, receiving a plurality of network messages, each of the plurality of network messages indicating a different source address, generating a plurality of device addresses based on the seed information and a corresponding plurality of invocations of a stateful random number generator, first determining that each of the different source addresses match a device address of the plurality of device addresses, and second determining, based on the first determining, that the wireless client device transmitted each of the plurality of network messages.

The methods presented herein may be embodied in a non-transitory computer readable storage medium comprising instructions that when executed configure one or more processors to perform the operations of the method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   communicating seed information between a wireless client device and a network infrastructure device;
   generating, via a random number generator, a plurality of random numbers, wherein the seed information is used to initialize the random number generator;
   generating, based on each of the plurality of random numbers generated by the random number generator, each of a plurality of identifiers that are to be used by the wireless client device in traffic sent via a network, wherein generating each of the plurality of identifiers is performed at least by a network infrastructure device;
   storing, by the network infrastructure device, the plurality of identifiers, wherein at least one identifier of the plurality of identifiers that are to be used by the wireless client device is generated and stored at least by the network infrastructure device prior to use of the at least one identifier by the wireless client device;
   obtaining, at the network infrastructure device, a plurality of network messages, each of the plurality of network messages comprising a different identifier; and
   determining, at the network infrastructure device, that each of the different identifiers match an identifier of the plurality of identifiers stored by the network infrastructure device to determine that the wireless client device provided each of the plurality of network messages.

2. The method of claim 1, wherein the plurality of identifiers comprise a plurality of device addresses.

3. The method of claim 2, wherein the plurality of device addresses comprise a plurality of Media Access Control (MAC) address.

4. The method of claim 1, further comprising sequentially associating a network resource with each of the different identifiers based on the determining.

5. The method of claim 4, wherein the sequentially associating comprises sequentially mapping a device address identifying the wireless client device on an external network to each of the different identifiers.

6. The method of claim 1, wherein the random number generator comprises a stateful random number generator.

7. The method of claim 6, wherein the stateful random number generator comprises a cryptographically secure pseudorandom number generator (CSPRNG).

8. The method of claim 1, further comprising providing to the wireless client device an order in which the plurality of identifiers are to be used by the wireless client device in the traffic sent via the network.

9. The method of claim 8, further comprising communicating a periodicity of identifier rotation for the wireless client device.

10. The method of claim 1, wherein generating each of the plurality of identifiers is also to be performed by the wireless client device.

11. The method of claim 1, further comprising:
prior to the obtaining, transmitting, by the network infrastructure device, the plurality of identifiers to the wireless client device.

12. An apparatus comprising:
one or more network interfaces configured to enable network communications;
one or more processors configured to perform operations on behalf of a network infrastructure device; and
one or more memories storing instructions that when executed configure the one or more processors to perform operations on behalf of a network infrastructure device, the operations comprising:
communicating, via the one or more network interfaces, seed information between a wireless client device and the network infrastructure device;
generating, via a random number generator, a plurality of random numbers, wherein the seed information is used to initialize the random number generator;
generating, based on each of the plurality of random numbers generated by the random number generator, each of a plurality of identifiers that are to be used by the wireless client device in traffic sent via a network, wherein generating each of the plurality of identifiers is performed at least by a network infrastructure device;
storing, by the network infrastructure device, the plurality of identifiers, wherein at least one identifier of the plurality of identifiers that are to be used by the wireless client device is generated and stored at least by the network infrastructure device prior to use of the at least one identifier by the wireless client device;
obtaining, at the network infrastructure device via the one or more network interfaces, a plurality of network messages, each of the plurality of network messages comprising a different identifier; and
determining, at the network infrastructure device, that each of the different identifiers match an identifier of the plurality of identifiers stored by the network infrastructure device to determine that the wireless client device provided each of the plurality of network messages.

13. The apparatus of claim 12, wherein the plurality of identifiers comprise a plurality of device addresses.

14. The apparatus of claim 13, wherein the plurality of device addresses comprise a plurality of Media Access Control (MAC) address.

15. The apparatus of claim 12, the operations further comprising sequentially associating a network resource with each of the different identifiers based on the determining.

16. The apparatus of claim 15, wherein the sequentially associating comprises sequentially mapping a device address identifying the wireless client device on an external network to each of the different identifiers.

17. The apparatus of claim 12, wherein the random number generator comprises a stateful random number generator.

18. A non-transitory computer readable storage medium comprising instructions that when executed configure one or more processors to perform operations comprising:
communicating seed information between a wireless client device and a network infrastructure device;
generating, via a random number generator, a plurality of random numbers, wherein the seed information is used to initialize the random number generator;
generating, based on each of the plurality of random numbers generated by the random number generator, each of a plurality of identifiers that are to be used by the wireless client device in traffic sent via a network, wherein generating each of the plurality of identifiers is performed at least by a network infrastructure device;
storing, by the network infrastructure device, the plurality of identifiers, wherein at least one identifier of the plurality of identifiers that are to be used by the wireless client device is generated and stored at least by the network infrastructure device prior to use of the at least one identifier by the wireless client device;
obtaining, at the network infrastructure device, a plurality of network messages, each of the plurality of network messages comprising a different identifier; and
determining, at the network infrastructure device, that each of the different identifiers match an identifier of the plurality of identifiers stored by the network infrastructure device to determine that the wireless client device provided each of the plurality of network messages.

19. The non-transitory computer readable storage medium of claim 18, wherein the plurality of identifiers comprise a plurality of Media Access Control (MAC) address.

20. The non-transitory computer readable storage medium of claim 18, further comprising sequentially associating a network resource with each of the different identifiers by sequentially mapping a device address identifying the wireless client device on an external network to each of the different identifiers.

* * * * *